(12) United States Patent
Koelmel et al.

(10) Patent No.: US 7,077,093 B2
(45) Date of Patent: Jul. 18, 2006

(54) FRESH GAS SUPPLY SYSTEM FOR A COMBUSTION ENGINE

(75) Inventors: Armin Koelmel, Haiterbach (DE); Uwe Paulini, Stuttgart (DE); Klaus Schweikert, Obersulm (DE); Holger Tratz, Waiblingen (DE)

(73) Assignee: MAHLE Filtersysteme GmbH, Stuttgart (DE)

( * ) Notice: Subject to any disclaimer, the term of this patent is extended or adjusted under 35 U.S.C. 154(b) by 113 days.

(21) Appl. No.: 10/418,522

(22) Filed: Apr. 18, 2003

(65) Prior Publication Data

US 2003/0230273 A1   Dec. 18, 2003

(30) Foreign Application Priority Data

Apr. 20, 2002 (DE) ............................... 102 17 760

(51) Int. Cl.
*F02B 27/02* (2006.01)
(52) U.S. Cl. .............................. 123/184.57; 123/184.24
(58) Field of Classification Search ............................... 123/184.21–184.61
See application file for complete search history.

(56) References Cited

U.S. PATENT DOCUMENTS

| | | | |
|---|---|---|---|
| 4,538,556 A | | 9/1985 | Takeda |
| 4,539,947 A | * | 9/1985 | Sawada et al. ........ 123/184.57 |
| 6,105,546 A | * | 8/2000 | Fuesser et al. ......... 123/184.57 |
| 6,192,850 B1 | * | 2/2001 | Rutschmann et al. ... 123/184.57 |
| 6,422,192 B1 | * | 7/2002 | Bloomer ................ 123/184.57 |
| 6,494,290 B1 | * | 12/2002 | Jessberger .................. 181/250 |
| 6,609,489 B1 | * | 8/2003 | Slopsema et al. ....... 123/184.57 |
| 6,732,509 B1 | * | 5/2004 | Shiga .......................... 60/312 |
| 6,758,304 B1 | * | 7/2004 | McLean ..................... 181/206 |
| 6,848,410 B1 | * | 2/2005 | Hoffmann et al. ..... 123/184.57 |

FOREIGN PATENT DOCUMENTS

| | | |
|---|---|---|
| DE | 3416950 | 1/1985 |
| DE | 42 15 416 | 11/1993 |
| EP | 1136674 | 9/2001 |

* cited by examiner

*Primary Examiner*—Marguerite McMahon
(74) *Attorney, Agent, or Firm*—Collard & Roe, P.C.

(57) ABSTRACT

The present invention relates to a fresh gas supply system for an internal combustion engine, in particular of a motor vehicle. A fresh gas distributor can be connected on the inlet side with a fresh gas feed line, and on the outlet side to an internal combustion engine by means of several connection pipes. The connection pipes are allocated in each case to a combustion chamber of the internal combustion engine.

Figure 1:
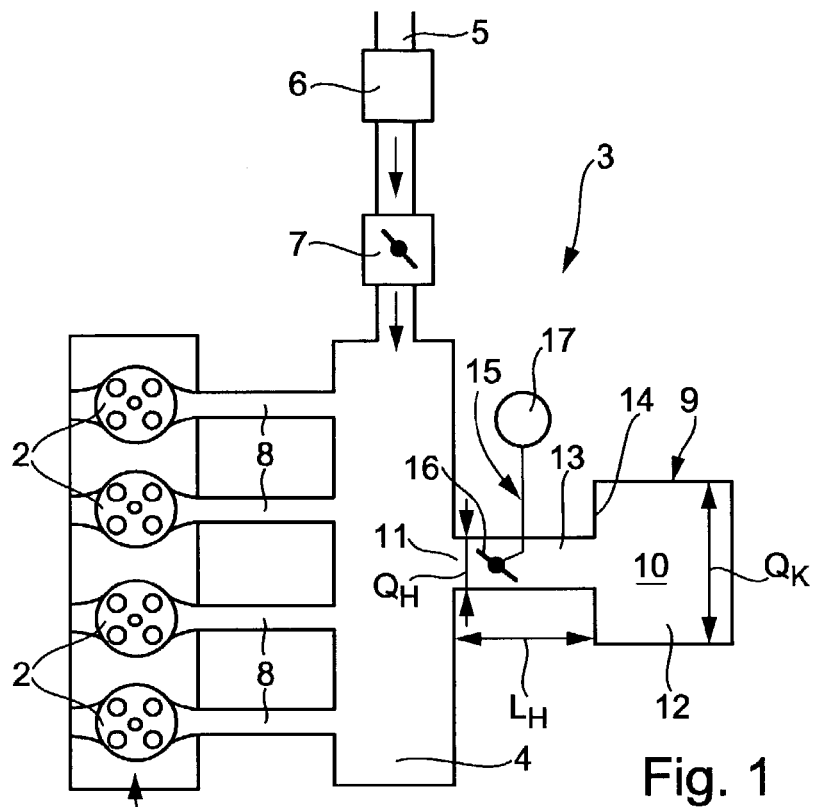

An improvement in the fresh gas supply system can be achieved in that a bypass resonator or Helmholtz resonator is connected to the fresh gas distributor, which, at a predetermined revolution speed of the internal combustion engine, improves the fresh gas filling of the combustion chambers by resonance charging.

4 Claims, 2 Drawing Sheets

FRESH GAS SUPPLY SYSTEM FOR A COMBUSTION ENGINE

The present invention relates to a fresh gas supply system for a combustion engine, of a motor vehicle in particular, with the features of the preamble to Claim 1.

A fresh gas supply system of this type is known from EP 1 136 674 A2, which exhibits a fresh gas distributor connected on the inlet side to a fresh gas feed line and on the outlet side is connected via several connection pipes to an internal combustion engine. These connection pipes are in this situation each allocated to a combustion chamber of the internal combustion engine. In order to take advantage of the ram tube charging effect, the fresh gas distributor functions as a ram effect accumulator, whereby the connection pipes form ram pipes. In order to take advantage of resonance charging effects, the known fresh gas supply system is connected to the fresh gas supply line via an upstream resonance accumulator, which is therefore flowed through. The connection between the resonance accumulator and the ram effect accumulator is effect in this situation by means of two length-adjustable resonance channels, which in each case are allocated to a half of the ram effect accumulator and the fresh gas distributor respectively. For the purpose of resonance charging, a resonance flap element is actuated, which in the fresh gas separator separates from one another the two ram effect accumulator halves which communicate with the resonance accumulator. The two ram effect accumulator halves then communicate with one another via the resonance channels and the resonance accumulator. By means of a longitudinal positioning of the resonance channels, the path length between the two ram effect accumulator halves can be adjusted. It is then possible, in the resonance range, for a pressure wave outgoing from one of the ram effect accumulator halves to pass through the resonance channels and the resonance accumulator into the other ram effect accumulator half, and there improve the fresh gas charging of the individual combustion chamber. The introduction of such a resonance accumulator requires a relatively large amount of installation space, which is not available in all application forms.

The present invention is concerned with the problem of providing an improved design for a fresh gas supply system of the type referred to in the preamble, which in particular requires relatively little installation space and/or makes possible improved charging.

This problem is resolved according to the invention by the object of the independent Claims. Advantageous embodiments are the object of the dependent Claims.

The invention is based on the general concept of connecting to the fresh gas distributor a bypass resonator or Helmholtz resonator, which is not flowed through, which amplifies the resonance charging of the combustion chambers. A resonator of this type can in principle be connected independently of the fresh gas feed line to any desired point of the fresh gas distributor, so that the fresh gas supply system according to the invention can be adapted particularly easily to the specified installation conditions. In this context, it is also of particular importance that, with the fresh gas supply system according to the invention, no resonance flap is required in the fresh gas distributor, so that the effort and expenditure for the realisation of such a system is reduced. With the aid of the resonator, it is possible, for the purpose of resonance charging, with a corresponding tuning of the resonator, for the pressure waves in the fresh gas distributor to be amplified, in order thereby to improve the charging of the individual combustion chambers. The fresh gas supply system according to the invention is accordingly based on a different principle of resonance charging to conventional systems, since while conventional systems only provide path lengths for a resonance charging, the invention can bring about an amplification of the resonance charging.

It is clear that such resonance charging will only function with an internal combustion engine with at least two cylinders.

With an bypass resonator or Helmholtz resonator, the gas or air volume contained therein forms a system capable of oscillation, which can be excited by the pressure waves in the fresh gas distributor. At certain revolution speeds, i.e. at specific excitation frequencies, resonances accordingly arise which cause an amplification of the pressure waves in the fresh gas distributor.

The resonator can be designed to be capable of adjustment in respect of its volume communicating with the fresh gas distributor, as a function of the revolution speed, by means of an adjustment device. Thanks to this measure, it is possible to achieve resonance charging at several revolution speeds or in several revolution speed ranges.

It is likewise possible for several resonators to be connected to the fresh gas distributor, which are matched to different revolution speeds or revolution speed ranges, with, for example, the different resonators having different volumes.

In another further embodiment, a control device can be provided for which opens or blocks the communicating connection between resonator and fresh gas distributor, as a function of the revolution speed. With the aid of this control device, the individual resonators can-be activated or deactivated depending on the requirement, in order, for example, to avoid disadvantageous reciprocal effects between the resonator and the fresh gas distributor outside the revolution speed range for which the individual resonator is designed.

The resonator exhibits a resonator chamber which communicates with the fresh gas volume by means of at least one resonance neck, whereby the resonance chamber exhibits a greater cross-section than each resonator neck. By means of this design, the oscillation system of the resonator is comparable to a "spring-mass oscillator", which is coupled to the oscillation system of the fresh gas distributor. With a corresponding tuning between the resonator neck and the resonator chamber, it is possible for an effective amplification of the pressure waves to be achieved for a predetermined revolution speed or for a predetermined revolution speed range, which improves the charging of the combustion chambers.

In a further embodiment the resonator chamber exhibits at least two resonator necks, which differ from one another in respect of their volumes, and especially in respect of neck length and/or neck cross-section. With this design it is possible for the resonator to be tuned, with the resonator chamber remaining the same, to two different revolution speeds or revolution speed ranges.

A resonator of this kind can also be adjusted to different revolution speeds or revolution speed ranges respectively in that the resonator neck and/or the resonator chamber are designed in respect of their volumes to be adjustable as a function of the revolution speed by means of a suitable setting adjustment device. With such a design it is possible, in particular, to achieve resonance charging over a relatively wide revolution speed range.

Further important features and advantages of the invention can be derived from the sub-Claims, from the drawings, and from the figure description pertaining thereto, on the basis of the drawings.

It is self-explanatory that the aforegoing features and those still to be explained hereinafter can be used not only in the combination indicated in each case, but also in other combinations or alone, without leaving the framework of the present invention.

Preferred embodiments of the invention are represented in the drawings and are explained in greater detail in the following description, whereby the same reference numbers relate to the same or functionally the same or similar components.

The figures show, in each case in diagrammatic form:

FIGS. 1 to 4 Representations of principle in circuit-diagram format of a fresh gas supply system according to the invention with different embodiments.

According to FIGS. 1 to 4, an internal combustion engine 1, in particular of a motor vehicle, e.g. with four combustion chambers 2, which is designed in the usual manner in cylinder areas, and are axially delimited by stroke-adjustable pistons. To supply the internal combustion engine 1 with fresh gas, a fresh gas supply system 3 according to the invention is provided, which in the embodiments exhibits a fresh gas distributor 4. In particular with an internal combustion engine 1 with several cylinder rows, several fresh gas distributors 4 can also be provided.

Connected on the inlet side of the fresh gas distributor 4 is a fresh gas feed line 5, in which can be arranged, for example, an air volume meter 6 and a choke flap valve 7. In addition, a fresh gas feed line 5 of this type usually contains an air filter, not shown, further upstream. Fresh gas, in particular ambient air, is conducted via the fresh gas feed line 5 to the fresh gas distributor 4. Arranged at the fresh gas distributor 4 is an individual connection pipe 8 for each combustion chamber 2, by means of which the fresh gas passes from the fresh gas distributor 4 into the individual combustion chambers 2.

According to the present invention, at least one resonator 9 is connected to the fresh gas distributor 4, in such a way that fresh gas does not flow through it. This resonator 9 is designed in the manner of a Helmholtz resonator or bypass resonator, the hollow interior 10 of which communicates via a connection aperture 11 with the fresh gas distributor 4, and which is also designed to be gas tight to the outside.

Accordingly, in the embodiments shown here, each resonator 9 has a resonator chamber 12, which communicates with the fresh gas distributor 4 by means of at least one resonator neck 13. The resonator chamber 12 accordingly differs from the resonator neck 13 pertaining to it in that the resonator chamber 12 encompasses a greater gas volume than the resonator neck 13. Accordingly, in this situation a chamber cross-section $Q_K$ is greater than a neck cross-section $Q_N$. To the purpose, the transition between the resonator 13 and the resonator chamber 12 is designed as a cross-sectional projection 14. The neck length is designated in the figures by $L_H$.

A resonator of this nature functions as follows:

With the internal combustion engine 1 in operation, the valve-controlled load change procedures of the combustion chambers 2 lead to pressure waves, which are disseminated in the connection pipes 8 and in the fresh gas distributor 4. At specific revolution speeds or revolution speed ranges respectively, an oscillation charge comes about, which is characterised in that, at the start of inlet and/or immediately before the end of inlet, a pressure wave accumulation occurs at the individual combustion chambers 2, and, as a result, the charge pressure or the flow rate respectively are increased.

The fresh gas contained in the resonator 9 forms a system capable of oscillation in the manner of a "spring-mass oscillator", in which the "spring" is formed by the fresh gas in the resonator chamber 12 and the "mass" by the fresh gas contained in the resonator neck 13. This resonance oscillation system is coupled to the oscillation system in the fresh gas distributor 4 via the connection aperture 11. In this manner, pressure waves which disseminate in the fresh gas distributor 4 excite the fresh gas in the resonator 9 at the connection aperture 11. At a certain revolution speed or at a certain revolution speed range, i.e. at a certain excitation frequency or at a certain excitation frequency, the oscillation system of the resonator 9 has a resonance behaviour which has the effect of amplifying the pressure waves in the fresh gas distributor 4. At these specific revolution speeds or revolution speed ranges, the resonator 9 has the effect of an amplifier for the pressure waves, as a result of which the resonance charging takes place at an increased charge pressure.

With the embodiment according to FIG. 1, only one single resonator 9 is provided for, which is designed to a specific revolution speed or a specific revolution speed range respectively of the internal combustion engine 1. In order to avoid undesirable interactions of the resonator 9 with the fresh gas supply outside the revolution speeds provided for the resonance charging, a control device 15 is provided, with the aid of which the resonator 9 can be activated and deactivated. For this purpose the control device 15 comprises, for example, a control element 16, with the aid of which a drive unit 17 can be adjusted. With the control element 16 the communicating connection between the resonator 9 and the fresh gas distributor 4 is opened or closed. A corresponding control action by the control device 15, not shown here, which can be integrated, for example, into an engine control unit of the internal combustion engine 1, activates the control element 16 as a function of the revolution speed of the internal combustion engine 1. In order to avoid undesirable interactions of the resonator 9 with the fresh gas supply outside the revolution speeds provided for the resonator charging, a control device 15 is provided for, with the aid of which the resonator 9 can be activated and deactivated. For this purpose the control device 15 comprises, for example, a control element 16, which can be adjusted with the aid of a drive unit 17. By means of the control element 16 the communicating connection between the resonator 9 and the fresh gas distributor 4 can be opened or blocked respectively. A corresponding control unit of the control device 15, not shown here, which can, for example, be integrated into an engine control system of the combustion engine 1, actuates the control element 16 as a function of the revolution speed of the internal combustion engine 1.

Figure 2:
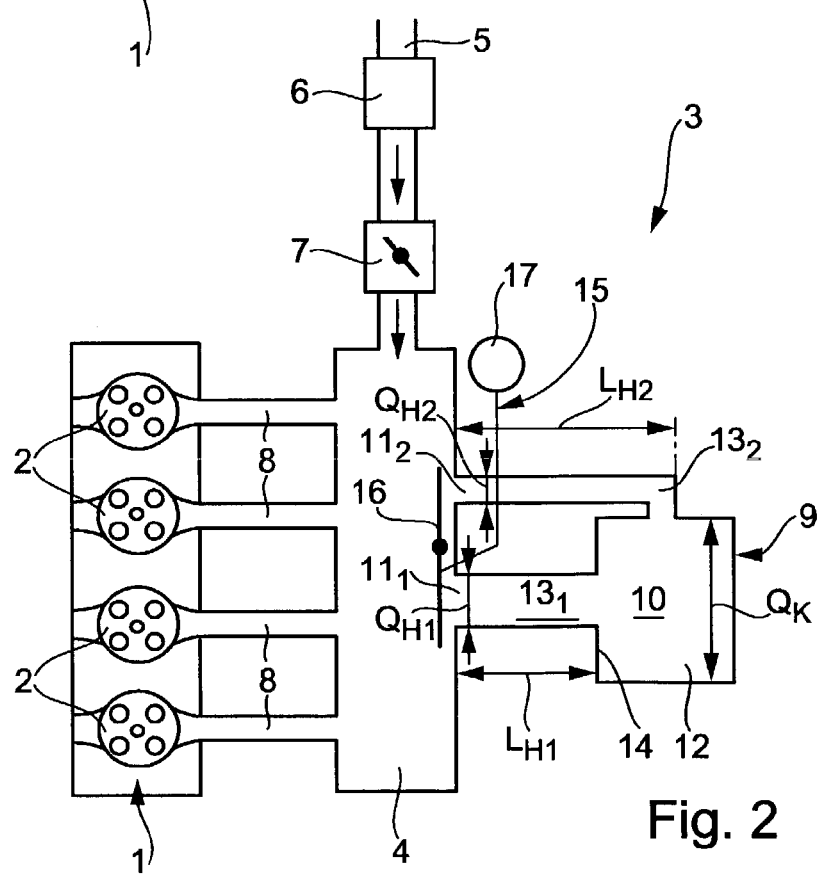

In accordance with FIG. 2, if possible, in another embodiment, for the resonance chamber 12 to communicate via two separate resonator necks $13_1$ and $13_2$ with the fresh gas distributor 4. The two resonator necks $13_1$ and $13_2$ differ from one another in that they have different neck cross-sections $Q_{H1}$ and $Q_{H2}$ respectively, as well as different neck lengths $L_{H1}$ and $L_{H2}$ respectively. With the aid of the different resonator necks $13_1$ and $13_2$, the resonator 9 is tuned to two different revolution speeds or to two different revolution speed ranges respectively, in which the resonance charging of the combustion chambers 2 is intended to be carried out.

The two resonance necks $13_1$ and $13_2$ communicate independently of one another with the fresh gas distributor 4, i.e. via their own connection apertures $11_1$ and $11_2$ respectively. In order to control this resonator 9, the control device 15 is again equipped with a control element 16, which in this embodiment is allocated to the two connection apertures $11_1$ and $11_2$. The control element 16 can be actuated with the drive 17 in such a way that in a first position reproduced in FIG. 2 both connection apertures $11_1$ and $11_2$ are blocked. In this first position, the resonator 9 is therefore completely deactivated. In a second position, the one connection aperture $11_1$ is opened, while the other connection aperture $11_2$ is blocked. Accordingly, the oscillation system is activated, formed by the first resonance neck $13_1$ and the resonance chamber 12. In the third switching position, the other connection aperture $11_2$ is now opened, while the connection aperture $11_1$ is blocked. Accordingly, with this third position, the second oscillation system is activated, formed from the second resonator neck $13_2$ and the resonator channel 12. The positioning device 15 can be equipped with two separate control elements 16, which can be actuated by means of one common or two separate drives 17.

It is clear that more than two resonator necks 13 can also be provided for, in order to connect the resonator chamber 12 to the fresh gas distributor 4, whereby the individual resonator necks 13 can also be individually activated and deactivated.

Figure 3:
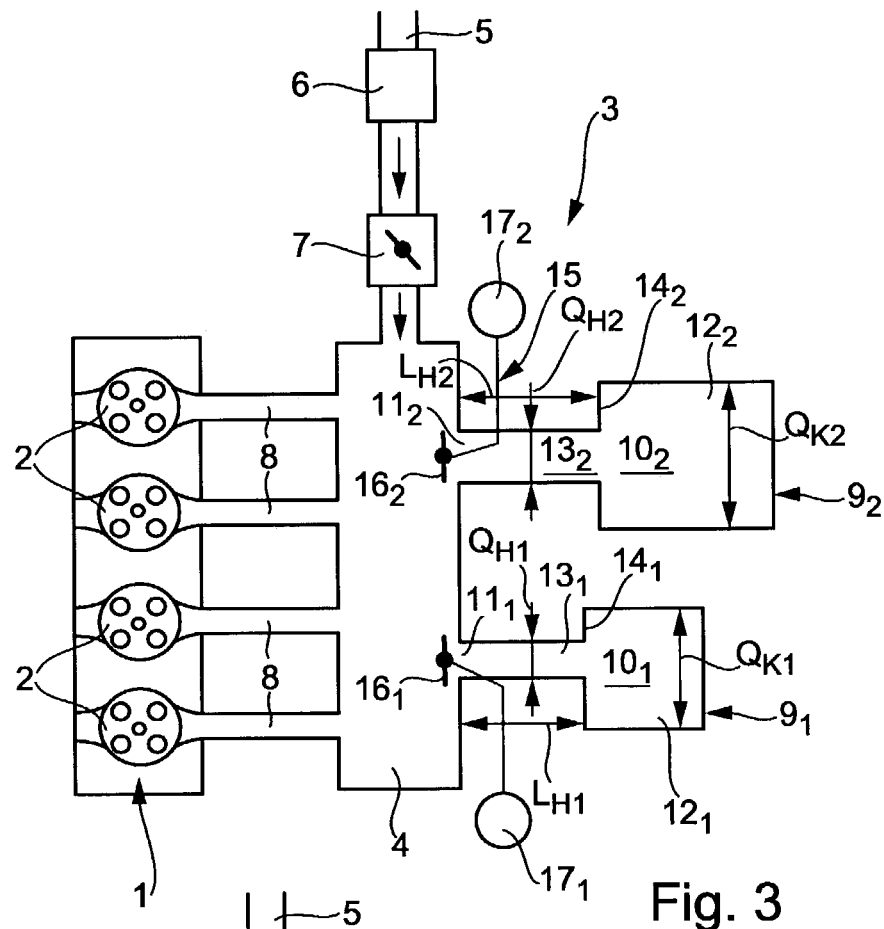

According to FIG. 3, in another embodiment two resonators $9_1$ and $9_2$ can be connected to the fresh gas distributor 4, whereby in this case too the resonators $9_1$, $9_2$, exhibit in each case a resonator chamber $12_1$, $12_2$, as well as a resonator neck $13_1$, $13_2$. The two resonators $9_1$, $9_2$, again communicate via separate connection apertures $11_1$, $11_2$ with the fresh gas distributor 4, whereby the connection apertures $11_1$ and $11_2$ can be opened and closed respectively by separate control elements $16_1$ and $16_2$. With this embodiment, the control device 15 has two separate drives $17_1$ and $17_2$.

The two resonators $9_1$ and $9_2$ are tuned to different revolution speeds or revolution speed ranges respectively. In particular, the resonance chambers $12_1$ and $12_2$ are equipped with different chamber cross-sections $Q_{K1}$ and $Q_{K2}$ respectively. In addition, in the embodiment shown here, the resonator necks $13_1$ and $13_2$ are provided with different neck lengths $L_{H1}$ and $L_{H2}$ respectively, as well as with different neck cross-sections $Q_{H1}$ and $Q_{H2}$.

With the aid of the control device 15 the two separate resonators $9_1$ and $9_2$ can be activated and deactivated respectively as a function of revolution speed of the internal combustion engine 1.

Likewise, more than two resonators 9 can also be connected to the fresh gas distributor 4.

Figure 4:
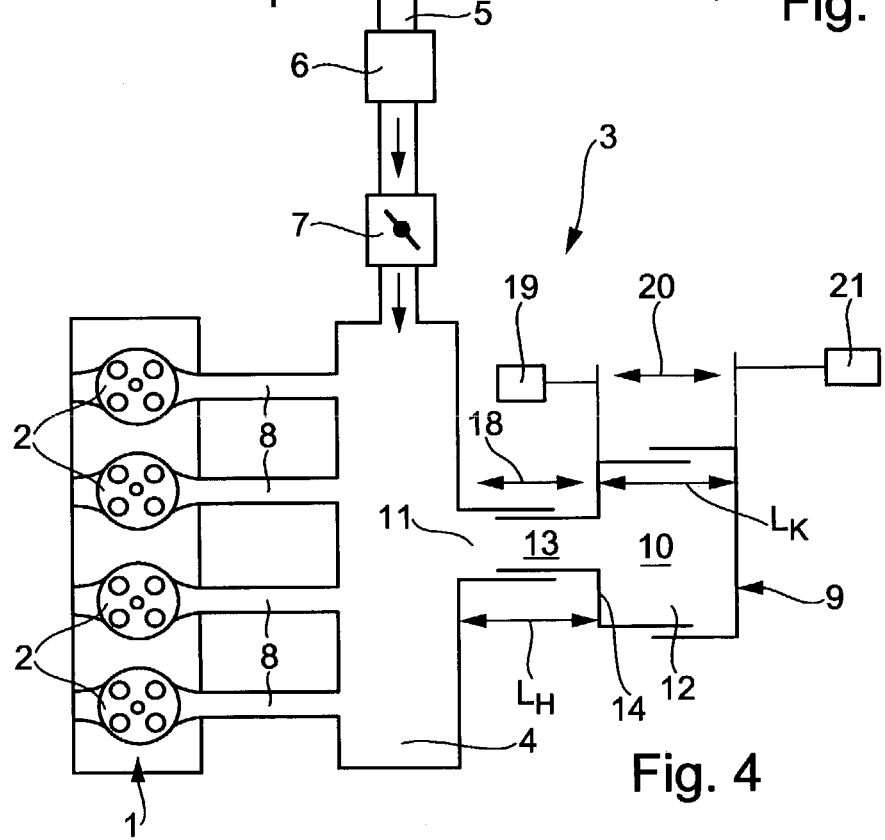

With the embodiment according to FIG. 4, only one resonator 9 is connected to the fresh gas distributor 4, the resonance behaviour of which can be adjusted by a volume change. For this purpose, for example, the resonator neck 13 is designed to be adjustable in length, which is symbolised by a double arrow 18. This is achieved, for example, by the resonator neck 13 being formed from two gas-tight telescopically adjustable tubes plugged into one another. For the active adjustment of the neck length $L_H$, a first setting adjustment device 19 is provided for, with which, for example, the tubes of the resonator neck 13 can be adjusted relative to one another.

In addition, or as an alternative, the volume of the resonance chamber 12 can also be varied. To do this, for example, the chamber length $L_K$ can be adjusted, which is indicated by a double arrow 20. For this purpose, the resonance chamber 12 may consist, for example, of two gas-tight cylinder bodies plugged onto one another, which are telescopically adjustable relative to one another. A second setting adjustment device 21 can be provided in order to carry out the longitudinal adjustment, which engages, for example, at one of the cylinder bodies, and brings about the corresponding relative adjustment movement.

As a result of the variation in the resonator volume, in particular of the neck length $L_H$ or of the chamber length $L_K$ respectively, the resonance behaviour of the resonator 9 can be tuned to different revolution speeds. In particular, therefore, the volume adjustment is effected with the aid of the setting adjustment device 21 as a function of the revolution speed of the internal combustion engine 1. In this way it is possible, with several different revolution speeds or speed ranges respectively for the desired resonance charging to be attained. The resonance charging can be guaranteed respectively over a relatively wide revolution speed range.

One particular advantage of the resonator 9 according to the invention can be seen in that it is not flowed through, and therefore does not need to be arranged between the fresh gas distributor 4 and the fresh gas feed line 5, but that it can in principle be connected in a communicating manner at any desired point to the fresh gas distributor 4. This is a particular advantage, since this design facilitates an adaptation to specified installation circumstances. Because the resonator 9 is not flowed through, a reduced flow resistance is also incurred, which has an advantageous effect in particular with an increase in revolution speed.

The invention claimed is:

1. A fresh gas supply system for a combustion engine (1), in particular of a motor vehicle, comprising
    at least one fresh gas distributor (4), which can be connected on the inlet side to a fresh gas feed line (5) and can be connected on the outlet side via several connection pipes (8) to an internal combustion engine (1),
    whereby the connection pipes (8) are in each case allocated to a combustion chamber (2) of the internal combustion engine (1);
    wherein at least one resonator (9) is connected to the fresh gas distributor (4) in the manner of a bypass resonator or a Helmholtz resonator, said resonator is adapted for amplifying a resonance charging of the combustion chambers (2) at at least one predetermined revolution speed or at at least one predetermined revolution speed range of the internal combustion engine (1);
    a control device (15) is provided for, which opens or blocks the communicating connection between the resonator (9) and fresh gas distributor (4) as a function of the revolution speed; and
    the control device (15) controls the communicating connection of the resonator necks ($13_1$, $13_2$) with the fresh gas distributor (4) as a function of the revolution speed in such a way that no, or always only one, reactor neck ($13_1$, $13_2$) is active.

2. The fresh gas supply system according to claim 1, wherein the resonator (9) has a volume which is communicating with the fresh gas distributor (4); and
    said resonator volume is dependent on the revolution speed by means of a setting adjustment device (19, 21).

3. The fresh gas supply system according to claim 1, wherein the resonator (9) exhibits a resonator chamber (12), which communicates by means of at least one resonator neck (13) with the fresh gas distributor (4), whereby the resonator chamber (12) exhibits a larger cross-section ($Q_K$) than that of the resonator neck ($Q_H$).

4. The fresh gas supply system according to claim 3, wherein at least two resonator necks ($13_1$, $13_2$) are provided for, which differ from one another in respect of the neck cross-section ($Q_{H1}$, $Q_{H2}$) and/or neck length ($L_{H1}$, $L_{H2}$).

* * * * *